(12) United States Patent
Tanaka (10) Patent No.: US 10,634,982 B2
(45) Date of Patent: Apr. 28, 2020

(54) LIGHT SOURCE DEVICE AND PROJECTION DISPLAY APPARATUS

(71) Applicant: Panasonic Intellectual Property Management Co. Ltd., Osaka (JP)

(72) Inventor: Takaaki Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/058,407

(22) Filed: Aug. 8, 2018

(65) Prior Publication Data

US 2019/0072840 A1   Mar. 7, 2019

(30) Foreign Application Priority Data

Sep. 1, 2017 (JP) ................. 2017-168202
Jun. 1, 2018 (JP) ................. 2018-105740

(51) Int. Cl.
*G03B 21/20* (2006.01)
*G02B 27/14* (2006.01)
(Continued)

(52) U.S. Cl.
CPC .......... *G03B 21/208* (2013.01); *G02B 5/045* (2013.01); *G02B 27/126* (2013.01); *G02B 27/141* (2013.01); *G02B 27/48* (2013.01); *G03B 21/2013* (2013.01); *G03B 21/2033* (2013.01); *G03B 21/2066* (2013.01);
(Continued)

(58) Field of Classification Search
CPC .... G03B 21/006; G03B 21/008; G03B 21/14; G03B 21/208; G03B 21/2013; G03B 21/2033; G02B 27/126; G02B 27/141; H04N 9/3152; H04N 9/3161; H04N 9/3164

See application file for complete search history.

(56) References Cited

U.S. PATENT DOCUMENTS 6,594,090 B2 * 7/2003 Kruschwitz ........ G02B 27/0927
345/88
2009/0323192 A1 * 12/2009 Towndrow ......... G02B 27/1013
359/634

(Continued)

FOREIGN PATENT DOCUMENTS

| JP | 2012-159823 | 8/2012 |
| JP | 2014-224923 | 12/2014 |
| WO | 2015/056381 | 4/2015 |

*Primary Examiner* — Sultan Chowdhury
(74) *Attorney, Agent, or Firm* — Wenderoth, Lind & Ponack, L.L.P.

(57) ABSTRACT

The light source device according to the present disclosure includes: a solid-state light source that emits red light having a luminous flux; a solid-state light source that emits green light having a luminous flux; a solid-state light source that emits blue light having a luminous flux; a dichroic mirror that combines, into combined light, the red light, the green light, and the blue light having exited from the respective solid-state light sources; a dynamic diffusion plate on which the combined light having exited from the dichroic mirror is incident; and a luminous-flux splitting element that splits the luminous flux that having exited from the solid-state light sources for emitting at least one of the red light, the green light, and the blue light.

14 Claims, 6 Drawing Sheets

(51) Int. Cl.
　　　*G02B 27/12*　　　(2006.01)
　　　*G02B 5/04*　　　　(2006.01)
　　　*G02B 27/48*　　　(2006.01)
　　　*G03B 33/12*　　　(2006.01)
　　　G03B 21/00　　　(2006.01)
　　　G03B 21/16　　　(2006.01)

(52) U.S. Cl.
　　　CPC ............ *G03B 33/12* (2013.01); *G03B 21/006* (2013.01); *G03B 21/008* (2013.01); *G03B 21/16* (2013.01)

(56) References Cited

U.S. PATENT DOCUMENTS

| | | | |
|---|---|---|---|
| 2010/0328626 A1* | 12/2010 | Miyazaki | H04N 9/3114 353/85 |
| 2012/0182529 A1* | 7/2012 | Otani | G02B 5/0215 353/38 |
| 2012/0242960 A1* | 9/2012 | Oiwa | G02B 27/48 353/31 |
| 2013/0107223 A1* | 5/2013 | Toyooka | G03B 21/16 353/31 |
| 2013/0286356 A1* | 10/2013 | Takahashi | H04N 5/7416 353/20 |
| 2014/0192331 A1* | 7/2014 | Toyooka | G03B 21/006 353/85 |
| 2015/0159832 A1* | 6/2015 | Takemoto | G02B 27/1073 353/81 |
| 2016/0198135 A1 | 7/2016 | Kita et al. | |

* cited by examiner

LIGHT SOURCE DEVICE AND PROJECTION DISPLAY APPARATUS

BACKGROUND

1. Technical Field

The present disclosure relates to projection display apparatuses each of which enlarges and projects images onto a screen by using a projection lens, with such images being formed by image forming elements that are irradiated with illumination light.

2. Description of the Related Art

Many types of light source devices have been disclosed each of which uses solid-state light sources, such as semiconductor lasers and light-emitting diodes, which feature long service life. Such light source devices are used as light sources of projection display apparatuses that use image forming elements such as liquid crystal panels and mirror-deflection digital micromirror devices (DMDs). Among them, a light source device featuring a small-size and a wide color gamut, which uses solid-state light sources of red, green, and blue, is disclosed in International Publication WO 2015/056381 (Patent Literature 1).

In accordance with Patent Literature 1, a projection image is made uniform by setting F-numbers of collection lenses to be substantially equal to each other, with the collection lens collecting color light having exited from respective red, green, and blue laser light sources. The use of the red, the green, and the blue laser light source which are disposed in an array, allows the configuration of a small-size, high-luminance light source device.

SUMMARY

The present disclosure is intended to provide a light source device and a projection display apparatus that uses the light source device. Such a light source device achieves a small-size and high-luminance with a wide color gamut while keeping high uniformity in projection images, even in cases where the numbers of semiconductor lasers are different among colors and yet where the sizes of luminous fluxes are different among the colors.

The light source device according to the present disclosure includes: a solid-state light source that emits red light having a luminous flux; a solid-state light source that emits green light having a luminous flux; a solid-state light source that emits blue light having a luminous flux; a dichroic mirror that combines, into combined light, the red light, the green light, and the blue light having exited from the respective solid-state light sources; a dynamic diffusion plate on which the combined light having exited from the dichroic mirror is incident; and a luminous-flux splitting element that splits the luminous flux that having exited from the solid-state light sources for emitting at least one of the red light, the green light, and the blue light.

In accordance with the present disclosure, the light source device is configured through the use of: the solid-state light sources for emitting the red, the green, and the blue light; the dichroic mirror for combining the color light having exited from the respective solid-state light sources; the rotary diffusion plate; and the luminous-flux splitting element that splits the color-light's luminous fluxes that have exited from the solid-state light sources for emitting at least one of the red, the green, and the blue light. The thus-configured light source device achieves a small-size and high-luminance with a wide color gamut while eliminating a decrease in unevenness in image which is attributed to the numbers of the solid-state light sources for the colors. This, in turn, allows the configuration of the projection display apparatus featuring a small-size and high-luminance with a wide color gamut.

DETAILED DESCRIPTION OF THE PREFERRED EMBODIMENT

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art.

Note that the accompanying drawings and the following descriptions are presented to facilitate fully understanding of the present disclosure by those skilled in the art and, therefore, are not intended to impose any limitations on the subject matter described in the appended claims.

First Exemplary Embodiment

Hereinafter, a first embodiment will be described with reference to FIGS. 1 to 4.

Figure 1:
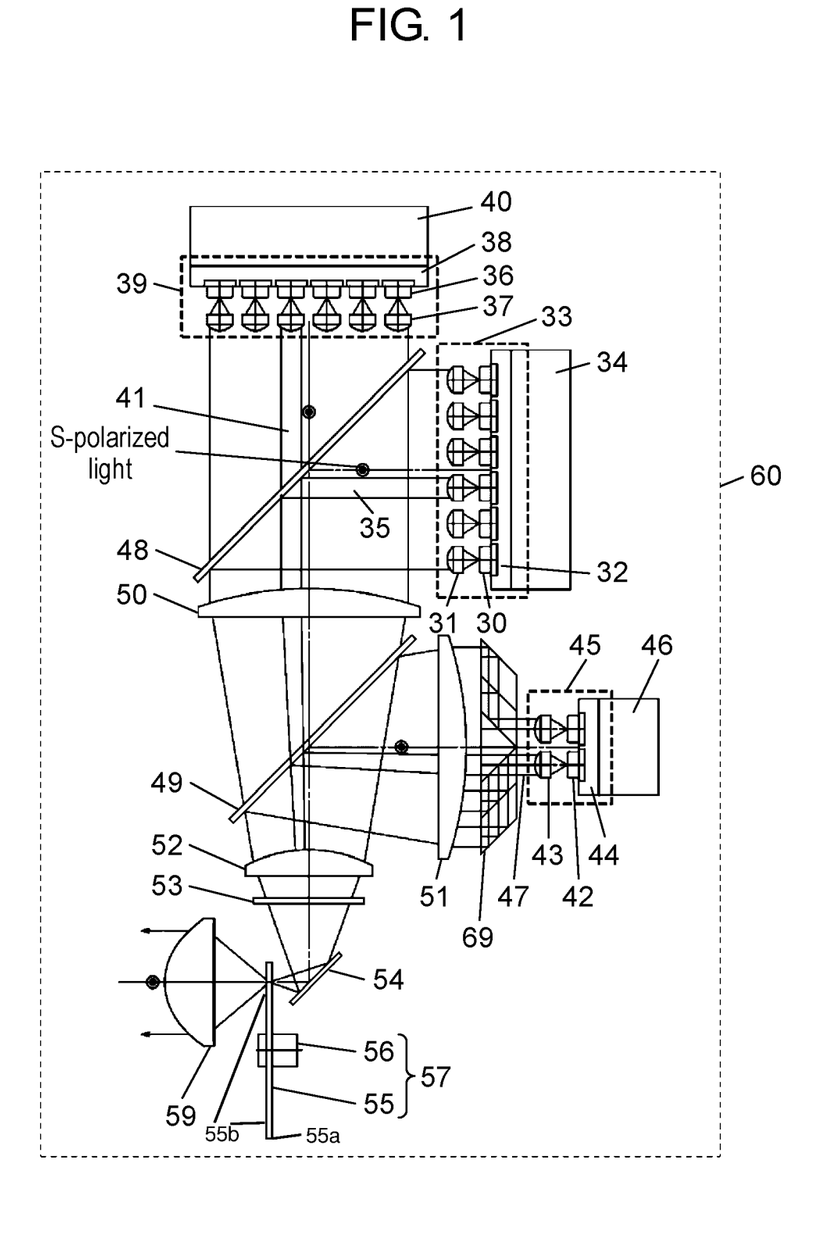
FIG. 1 is a view of a configuration of a light source device according to a first embodiment of the present disclosure.

FIG. 1 is a view of a configuration of light source device 60 according to the embodiment.

Red laser light source 33 is configured with: red semiconductor lasers 30 being red solid-state light sources; collimator lenses 31; and heat dissipation plate 32. Green laser light source 39 is configured with: green semiconductor lasers 36 being green solid-state light sources; collimator lenses 37; and heat dissipation plate 38. Blue laser light source 45 is configured with: blue semiconductor lasers 42 being blue solid-state light sources; collimator lenses 43 and heat dissipation plate 44.

Moreover, light source device 60 includes: heat sinks 34, 40, and 46; red-reflection dichroic mirror 48; condenser lenses 50, 51, 52, and 59; prism array 69 being a luminous-flux splitting element; blue-reflection dichroic mirror 49; diffusion plate 53; rotary diffusion plate 57 which is a dynamic diffusion plate for reducing speckle noises and is configured with circular diffusion plate 55 and motor 56; and reflection mirror 54. FIG. 1 shows an aspect of each of luminous fluxes 35, 41, and 47, which exit from the respective semiconductor laser light sources, and shows polarization directions of the light entering/exiting from red-reflection dichroic mirror 48 and blue-reflection dichroic mirror 49.

Red laser light source 33 is configured including: 24 units (6×4) of red semiconductor lasers 30 arrayed in a square arrangement, and collimator lenses 31. These semiconductor lasers and collimator lenses are disposed two-dimensionally at regular intervals on heat dissipation plate 32. Each of red semiconductor lasers 30 emits red light in a wavelength width from 632 nm to 648 nm, thereby causing linearly-polarized light to exit from it. The red light having exited from red semiconductor laser 30 is condensed by a corresponding one of collimator lenses 31, thereby being converted into collimated luminous flux 35. A group of luminous fluxes 35 enter red-reflection dichroic mirror 48 to be reflected off it. Heat sink 34 is intended to cool red laser light source 33.

Green laser light source 39 is configured including: 24 units (6×4) of green semiconductor lasers 36 arrayed in a square arrangement, and collimator lenses 37. These semiconductor lasers and collimator lenses are disposed two-dimensionally at regular intervals on heat dissipation plate 38. Each of green semiconductor lasers 36 emits green light in a wavelength width from 517 nm to 533 nm, thereby causing linearly-polarized light to exit from it. The green light having exited from green semiconductor laser 36 is condensed by a corresponding one of collimator lenses 37, thereby being converted into a corresponding one of collimated luminous fluxes 41. A group of luminous fluxes 41 enter red-reflection dichroic mirror 48 to pass through it. The semiconductor lasers for emitting the color light are disposed such that the polarized light exiting from each of green semiconductor laser 36 and red semiconductor laser 30 is S-polarized light with respect to the plane of incidence of red-reflection dichroic mirror 48. Heat sink 40 is intended to cool green laser light source 39.

Blue laser light source 45 is configured including: eight (8) units (2×4) of blue semiconductor lasers 42 arrayed in a square arrangement, and collimator lenses 43. These semiconductor lasers and collimator lenses are disposed two-dimensionally at regular intervals on heat dissipation plate 44. The number of blue semiconductor lasers 42 that configure such a blue laser light source is not larger than one-third (⅓) each of the numbers of the red and green semiconductor lasers. This is because each of the blue semiconductor lasers has high light output and luminous efficiency, on a single laser-element basis, compared to each of the red and the green semiconductor lasers, and because the light output required for achieving a desired white-light chromaticity is small. Blue semiconductor lasers 42 are disposed such that the polarized light exiting from the blue semiconductor lasers is S-polarized light with respect to the plane of incidence of blue-reflection dichroic mirror 49. Heat sink 46 is intended to cool blue laser light source 45.

Blue semiconductor laser 42 emits blue light in a wavelength width from 457 nm to 472 nm, thereby causing linearly-polarized light to exit from it. The light having exited from blue semiconductor laser 42 is condensed by a corresponding one of collimator lenses 43, thereby being converted into a corresponding one of collimated luminous fluxes 47. A group of luminous fluxes 47 enter prism array 69 being a luminous-flux splitting element.

Figure 2:
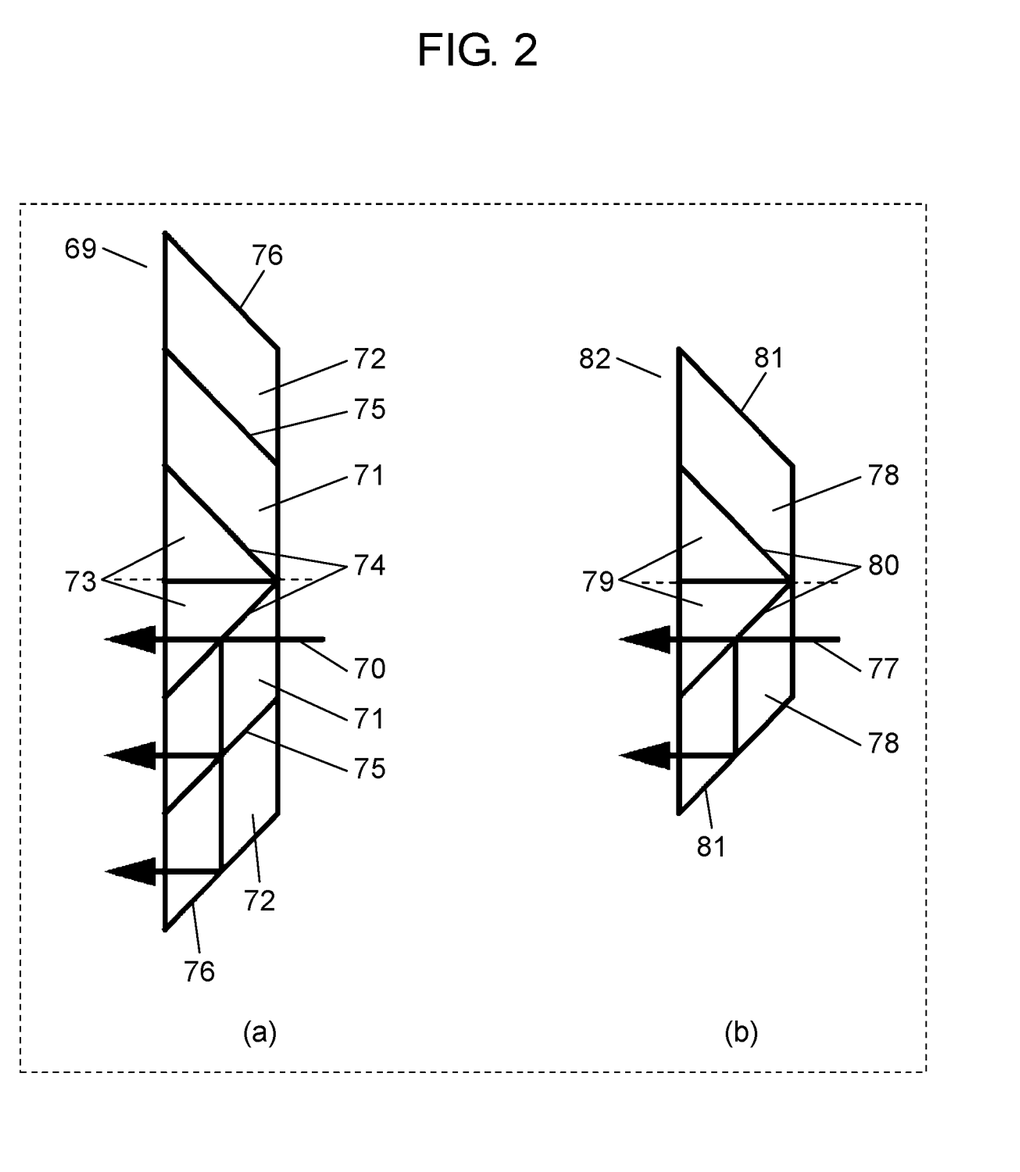
FIG. 2 is views of first luminous-flux splitting elements according to the first embodiment.

FIG. 2 is views of configurations of first prism arrays, each of which serves as a first luminous-flux splitting element. The first prism array splits luminous fluxes having exited from a plurality of the respective solid-state light sources that emits the color light of at least one color. Part (a) of FIG. 2 shows prism array 69 that splits light incident thereon in three (3); part (b) of FIG. 2 shows prism array 82 that splits light incident thereon in two (2).

The configuration of prism array 69 shown in part (a) of FIG. 2 is described. Prism array 69 is configured such that the same groups of prisms 71, 72, and 73 are disposed symmetrically with respect to a symmetry plane that is the plane indicated by the dashed line shown in the part. That is, the same groups of the prisms are plane-symmetrically disposed in both up and down directions in the part. Prism 71 is provided with beam-splitter plane 74 functional for an incident angle of 45 degrees. Prism 72 is provided with: beam-splitter plane 75 functional for an incident angle of 45 degrees, and reflection plane 76.

Incident light 70 having entered prism 71 is incident on beam-splitter plane 74 at an incident angle of 45 degrees, and then its luminous flux is split such that the amount of transmitted light and the amount of reflected light are in the proportions of 33% and 67%, respectively. The thus-transmitted light is transmitted through prism 73. The thus-reflected light is incident on beam-splitter plane 75 at an incident angle of 45 degrees, and then its luminous flux is further split such that the amount of transmitted light and the amount of reflected light are in the proportions of 50% and 50%, respectively. The light having been transmitted through beam-splitter plane 75 is reflected off reflection plane 76. Prism 71 is joined to prism 73 and prism 72 with a silicone-based adhesive that exhibits good resistance to heat and light. In this way, incident light 70 is split into the three luminous fluxes, the amounts of light intensities of which are in the respective proportions of 33%, 33.5%, and 33.5%. The spacing at which the luminous flux is split is set equal to the arrangement spacing of the semiconductor lasers of the corresponding laser light source.

Prism array 69 causes the luminous fluxes, which have exited from blue laser light source 45 provided with blue semiconductor lasers 42 disposed in the 2×4 arrangement, to be split into 6×4-arrayed luminous fluxes. The configuration makes it possible to cause the size of the luminous fluxes having exited from blue laser light source 45 to be equivalent to the size of each of the red and the green laser light source which is provided with the corresponding semiconductor lasers disposed in the 6×4 arrangement. This allows the configuration of the small-size light source device while eliminating degradation in uniformity of projection images which is attributed to the number of the semiconductor lasers and the size of the luminous fluxes.

The configuration of prism array 82 shown in part (b) of FIG. 2 is described. Prism array 82 is configured such that the same pairs of prisms 78 and 79 are disposed symmetrically with respect to a symmetry plane that is the plane indicated by the dashed line shown in the part. That is, the same pairs of the prisms are plane-symmetrically disposed in both up and down directions in the part. Prism 78 is provided with: beam-splitter plane 80 functional for an incident angle of 45 degrees, and reflection plane 81.

Incident light 77 having entered prism 78 is incident on beam-splitter plane 80 at an incident angle of 45 degrees, and then its luminous flux is split such that the amount of transmitted light and the amount of reflected light are in the proportions of 50% and 50%, respectively. The thus-transmitted light is transmitted through prism 79. The thus-reflected light is reflected off reflection plane 81. Prism 78 is joined to prism 79 with a silicone-based adhesive that exhibits good resistance to heat and light. In this way, incident light 77 is split in two (2) such that the amounts of light intensities of the two are in the respective proportions of 50% and 50%. The spacing at which the luminous flux is split is set equal to the arrangement spacing of the semiconductor lasers of the corresponding laser light source.

Prism array 82 causes the luminous fluxes, which have exited from blue laser light source 45 provided with blue semiconductor lasers 42 disposed in the 2×4 arrangement, to be split into 4×4-arrayed luminous fluxes. Through such a split, the uniformity in projection images attributed to the number of the semiconductor lasers and the size of the luminous fluxes is improved proportionately, although the uniformity remains lower than that in the case where prism array 69 splits the luminous fluxes having exited from blue laser light source 45 into the 6×4-arrayed luminous fluxes. Fortunately, the split allows the size of the luminous fluxes having exited from blue laser light source 45 to remain smaller than the size of each of the red and the green laser light source. Such a smaller size of the luminous fluxes enables the light source device to be configured at a low cost.

Figure 3:
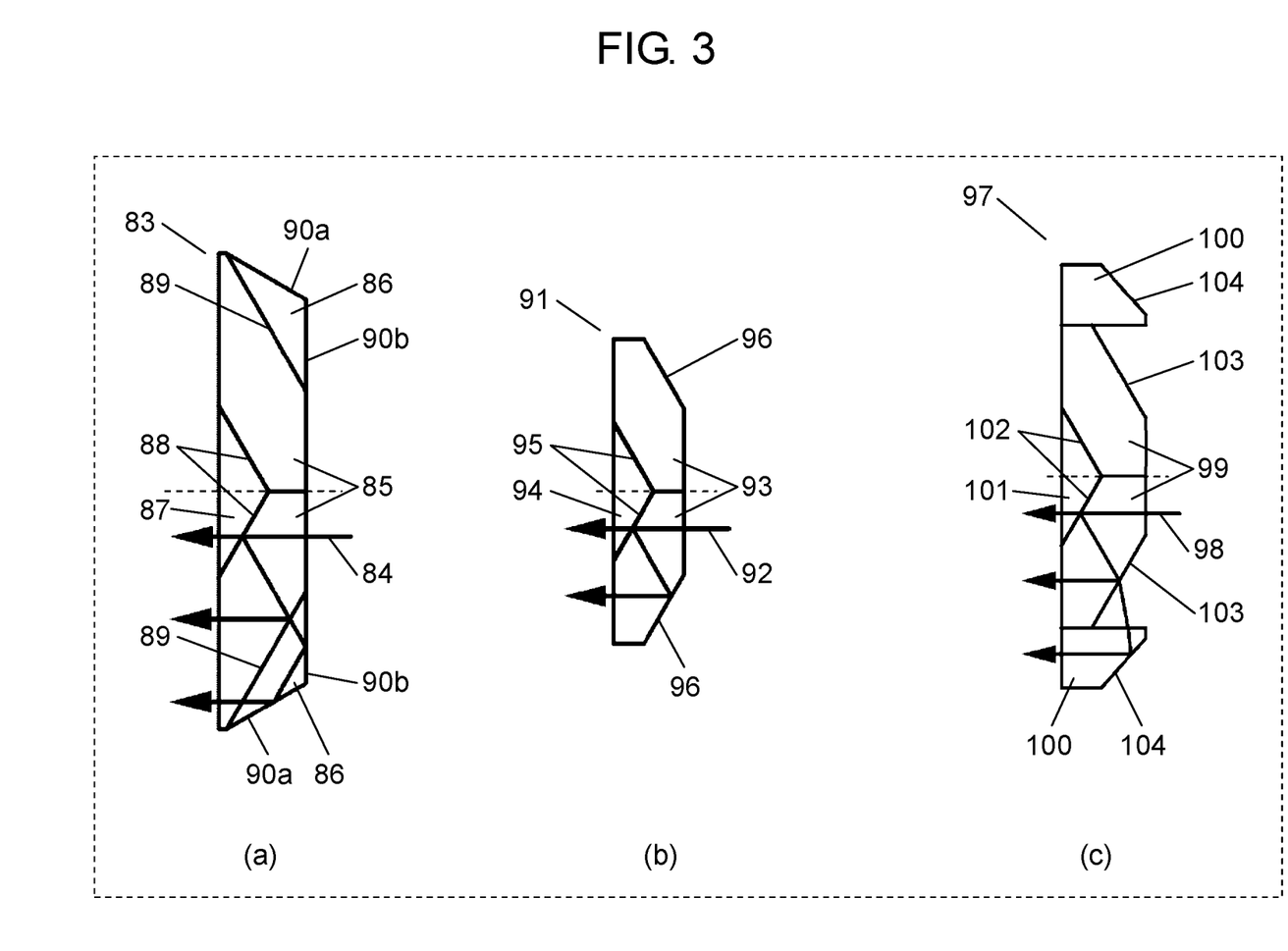
FIG. 3 is views of second luminous-flux splitting elements according to the first embodiment.

FIG. 3 is views of configurations of second prism arrays, each of which serves as a second luminous-flux splitting element. The second prism arrays splits luminous fluxes having exited from a plurality of the solid-state light sources that emits the color light of at least one color. Part (a) of FIG. 3 shows prism array 83 that splits light incident thereon in three (3); part (b) of FIG. 3 shows prism array 91 that splits light incident thereon in two (2); part (c) of FIG. 3 shows another prism array, prism array 97, that splits light incident thereon in three (3).

The configuration of prism array 83 shown in part (a) of FIG. 3 is described. Prism array 83 is configured such that the same pairs of prisms 85 and 86 are disposed symmetrically with respect to a symmetry plane that is the plane indicated by the dashed line shown in the part. That is, the same pairs of the prisms are plane-symmetrically disposed in both up and down directions in the part. The prism array further includes prism 87 that is disposed at the location of the symmetry plane. Prism 85 is provided with beam-splitter planes 88 and 89 functional for an incident angle of 30 degrees. Prism 86 is provided with two reflection planes 90*a* and 90*b*.

Incident light 84 having entered prism 85 is incident on beam-splitter plane 88 at an incident angle of 30 degrees, and then its luminous flux is split such that the amount of transmitted light and the amount of reflected light are in the proportions of 33% and 67%, respectively. The thus-transmitted light is transmitted through prism 87. The thus-reflected light is incident on beam-splitter plane 89 at an incident angle of 30 degrees, and then its luminous flux is split such that the amount of transmitted light and the amount of reflected light are in the proportions of 50% and 50%, respectively. The light having been transmitted through beam-splitter plane 89 is reflected off every one of two reflection planes 90*a* and 90*b* of prism 86. Prism 85 is joined to each of prism 86 and prism 87, with an air layer with a thickness of not larger than 10 μm being disposed between the thus-joined prisms. Because of the absence of adhesive, the configuration exhibits better resistance to heat and light than that of prism array 69 shown in part (a) of FIG. 2. In this way, incident light 84 is split into the three luminous fluxes, the amounts of light intensities of which are in the respective proportions of 33%, 33.5%, and 33.5%. The spacing at which the luminous flux is split is set equal to the arrangement spacing of the semiconductor lasers of the corresponding laser light source.

Prism array 83 causes the luminous fluxes, which have exited from blue laser light source 45 provided with blue semiconductor lasers 42 disposed in the 2×4 arrangement, to be split into 6×4-arrayed luminous fluxes. The configuration makes it possible to cause the size of the luminous fluxes having exited from blue laser light source 45 to be equivalent to the size of each of the red and the green laser light source which is provided with the corresponding semiconductor lasers disposed in the 6×4 arrangement. This allows the configuration of the small-size, high-durability light source device while maintaining uniformity of projection images which is attributed to the number of the semiconductor lasers and the size of the luminous fluxes.

The configuration of prism array 91 shown in part (b) of FIG. 3 is described. Prism array 91 is configured such that prisms 93 are disposed symmetrically with respect to a symmetry plane that is the plane indicated by the dashed line shown in the part. That is, the same prisms are plane-symmetrically disposed in both up and down directions in the part. The prism array further includes prism 94 that is disposed at the location of the symmetry plane. Prism 93 is provided with: beam-splitter plane 95 functional for an incident angle of 30 degrees, and reflection plane 96.

Incident light 92 having entered prism 93 is incident on beam-splitter plane 95 at an incident angle of 30 degrees, and then its luminous flux is split such that the amount of transmitted light and the amount of reflected light are in the proportions of 50% and 50%, respectively. The thus-transmitted light is transmitted through prism 94. The thus-reflected light is reflected off reflection plane 96. Prism 93 is joined to prism 94, with an air layer with a thickness of not larger than 10 μm being disposed between the thus-joined prisms. Because of the absence of adhesive, the configuration exhibits better resistance to heat and light than that of prism array 82 shown in part (b) of FIG. 2. In this way, incident light 92 is split into the two luminous fluxes, the amounts of light intensities of which are in the respective proportions of 50% and 50%. The spacing at which the luminous flux is split is set equal to the arrangement spacing of the semiconductor lasers of the corresponding laser light source.

Prism array 91 causes the luminous fluxes, which have exited from blue laser light source 45 provided with blue semiconductor lasers 42 disposed in the 2×4 arrangement, to be split into 4×4-arrayed luminous fluxes. Through such a split, the uniformity in projection images attributed to the number of the semiconductor lasers and the size of the luminous fluxes is improved proportionately, although the uniformity remains lower than that in the case where prism array 83 splits the luminous fluxes having exited from blue laser light source 45 into the 6×4-arrayed luminous fluxes. Fortunately, the split allows the size of the luminous fluxes having exited from blue laser light source 45 to remain smaller than the size of each of the red and the green laser light source. Such a small size of the luminous fluxes enables the light source device to be configured, at a low cost, to have high durability.

The configuration of prism array 97 shown in part (c) of FIG. 3 is described. Prism array 97 is configured such that the same pairs of prisms 99 and 100 are disposed symmetrically with respect to a symmetry plane that is the plane indicated by the dashed line shown in the part. That is, the same pairs of the prisms are plane-symmetrically disposed in both up and down directions in the part. The prism array further includes prism 101 that is disposed at the location of the symmetry plane. Prism 99 is provided with beam-splitter planes 102 and 103 functional for an incident angle of 45 degrees. Prism 100 is provided with reflection plane 104.

In FIG. 3, a difference of the configuration of the prism array shown in part (c) from that shown in part (a) lies in the number of the pairs of prism-joining surfaces, each pair of which interposes an air layer between the corresponding prism-joining surfaces. That is, the number of the pairs is reduced from four (4) in part (a) to two (2) in part (c). Incident light 98 having entered prism 99 is incident on beam-splitter plane 102 at an incident angle of 45 degrees, and then its luminous flux is split such that the amount of transmitted light and the amount of reflected light are in the proportions of 33% and 67%, respectively. The thus-transmitted light is transmitted through prism 101. The thus-reflected light is incident on beam-splitter plane 103 at an incident angle of 45 degrees, and then its luminous flux is split such that the amount of transmitted light and the amount of reflected light are in the proportions of 50% and 50%, respectively. The light having been transmitted through beam-splitter plane 103 enters prism 100 to be reflected off reflection plane 104. Prism 99 is joined to prism 100 with a silicone-based adhesive that exhibits good resistance to heat and light. In this way, the incident light is split into the three luminous fluxes, the amounts of light intensities of which are in the respective proportions of 33%, 33.5%, and 33.5%. The reduction of the number of the pairs of prism-joining surfaces, each of which is provided with an air layer between the corresponding prism-joining surfaces, allows a reduction in cost of the prism array, compared to the prism array shown in part (a) in FIG. 3.

Note that two prisms 73 shown in FIG. 2 may be integrally configured by using a single prism that is integrally configured, as in the cases of prisms 87, 94, and 101 shown in FIG. 3; this is true also for two prisms 79 shown in FIG. 2. Conversely, prism 87 shown in FIG. 3 may be separately configured by using two prisms that are disposed in symmetrically with respect to a plane, as in the cases of prisms 73 and 79 shown in FIG. 2; this is true also for each of prisms 94 and 101 shown in FIG. 3.

Figure 4:
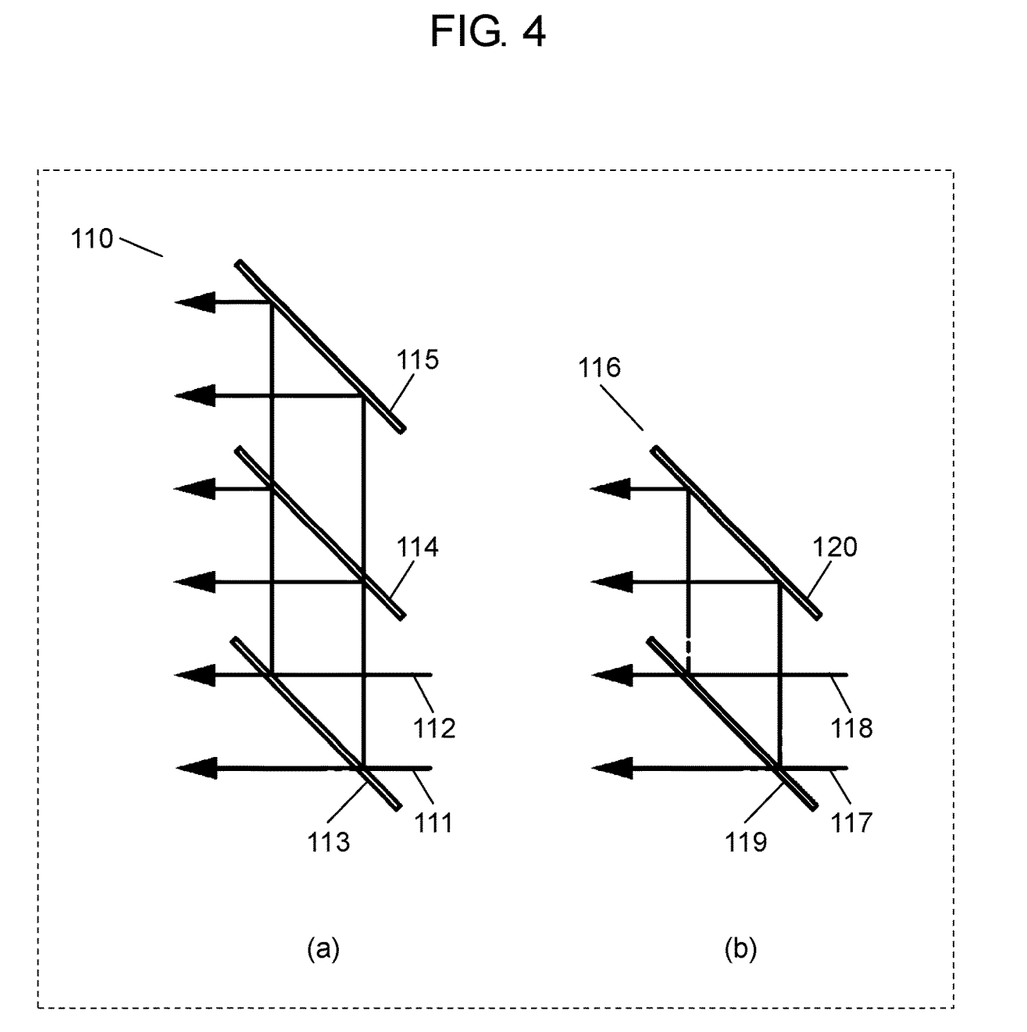
FIG. 4 is views of third luminous-flux splitting elements according to the first embodiment.

FIG. 4 is views of configurations of mirror arrays, each of which serves as a third luminous-flux splitting element. The mirror arrays splits luminous fluxes having exited from a plurality of the solid-state light sources that emits the color light of at least one color. Part (a) of FIG. 4 shows mirror array 110 that splits light incident thereon in three (3); part (b) of FIG. 4 shows mirror array 116 that splits light incident thereon in two (2).

The configuration of mirror array 110 shown in part (a) of FIG. 4 is described. Mirror array 110 includes: plate beam-splitters 113 and 114 functional for an incident angle of 45 degrees, and reflection mirror 115.

Incident light 111 and 112 are incident on plate beam-splitter 113 at an incident angle of 45 degrees, and then each of their luminous fluxes is split such that the amount of transmitted light and the amount of reflected light are in the proportions of 33% and 67%, respectively. The thus-reflected light is incident on plate beam-splitter 114 at an incident angle of 45 degrees, and then its luminous flux is split such that the amount of transmitted light and the amount of reflected light are in the proportions of 50% and 50%, respectively. The light having been transmitted through plate beam-splitter 114 is reflected off reflection mirror 115. Use of the plane mirrors to configure the mirror array results in a slight increase in size of the mirror array compared to the corresponding prism array; however, it can be configured at a low price. In this way, incident light 111 and 112 are each split into the three luminous fluxes, the amounts of light intensities of which are in the respective proportions of 33%, 33.5%, and 33.5%. The spacing at which the luminous flux is split is set equal to the arrangement spacing of the semiconductor lasers of the corresponding laser light source.

Mirror array 110 causes the luminous fluxes, which have exited from blue laser light source 45 provided with blue semiconductor lasers 42 disposed in the 2×4 arrangement, to be split into 6×4-arrayed luminous fluxes. The configuration makes it possible to cause the size of the luminous fluxes having exited from blue laser light source 45 to be equivalent to the size of each of the red and the green laser light source which is provided with the corresponding semiconductor lasers disposed in the 6×4 arrangement. This allows the configuration of the small-size light source device, at a low price, while maintaining uniformity of projection images which is attributed to the number of the semiconductor lasers and the size of the luminous fluxes.

The configuration of mirror array 116 shown in part (b) of FIG. 4 is described. Mirror array 116 includes: plate beam-splitters 119 functional for an incident angle of 45 degrees, and reflection mirror 120.

Incident light 117 and 118 are incident on plate beam-splitter 119 at an incident angle of 30 degrees, and then each of their luminous flux is split such that the amount of transmitted light and the amount of reflected light are in the proportions of 50% and 50%, respectively. The light having been reflected off plate beam-splitter 119 is reflected off reflection mirror 120. In this way, incident light 117 and 118 are each split into the two luminous fluxes, the amounts of light intensities of which are in the respective proportions of 50% and 50%. The spacing at which the luminous flux is split is set equal to the arrangement spacing of the semiconductor lasers of the corresponding laser light source.

Mirror array 116 causes the luminous fluxes, which have exited from blue laser light source 45 provided with blue semiconductor lasers 42 disposed in the 2×4 arrangement, to be split into 4×4-arrayed luminous fluxes. Through such a split, the uniformity in projection images attributed to the number of the semiconductor lasers and the size of the luminous fluxes is improved proportionately, although the uniformity remains lower than that in the case where mirror array 110 splits the luminous fluxes having exited from blue laser light source 45 into the 6×4-arrayed luminous fluxes. Fortunately, the split allows the size of the luminous fluxes having exited from blue laser light source 45 to remain smaller than the size of each of the red and the green laser light source. Such a smaller size of the luminous fluxes enables blue laser light source 45 to be configured, at a very low price, to be smaller than the red and the green laser light source.

Through the use of any of the luminous-flux splitting elements shown in FIGS. 2 to 4, the blue, the red, and the green laser light source can be made equivalent to each other, in the numbers of their semiconductor lasers and in the sizes of their luminous fluxes, while configuring the luminous-flux splitting element in a small size.

Now referring back to the configuration shown in FIG. 1, descriptions are made. The red and the green laser light, which have been combined by red-reflection dichroic mirror 48, enter condenser lens 50.

Red-reflection dichroic mirror 48 has characteristics in which, at the incident angle of 45 degrees, it transmits not smaller than 96% of the green laser light and reflects not smaller than 98% of the red laser light. The half-value wavelength with which the red-reflection dichroic mirror's transmittance is 50% is set equal to 583 nm that is an intermediate wavelength between the dominant wavelength of 525 nm of the green laser light and the dominant wavelength of 640 nm of the red laser light.

On the other hand, the blue laser light which has been split by prism array 69 serving as the luminous-flux splitting element, enters condenser lens 51. The red and the green laser light and the blue laser light, which are respectively converged by condenser lenses 50 and 51, together enter blue-reflection dichroic mirror 49.

Blue-reflection dichroic mirror 49 has characteristics in which, at the incident angle of 45 degrees, it transmits not smaller than 96% of the red and the green laser light and reflects not smaller than 98% of the blue laser light. The half-value wavelength with which the blue-reflection dichroic mirror's transmittance is 50% is set equal to 495 nm that is an intermediate wavelength between the dominant wavelength of 465 nm of the blue laser light and the dominant wavelength of 525 nm of the green laser light.

The laser light having passed through blue-reflection dichroic mirror 49 and the laser light having been reflected off the blue-reflection dichroic mirror, enter condenser lens 52. Condenser lens 52 has a lens shape that is determined such that the condenser lens can converge, in combination with a corresponding one of condenser lenses 50 and 51, each of the laser light fluxes in the vicinity of rotary diffusion plate 57. The laser light passes through condenser lens 52, is diffused by diffusion plate 53, is reflected off reflection mirror 54, and then enters rotary diffusion plate 57. Diffusion plate 53 is configured including a diffusion surface that is composed of fine microlenses formed in an array on a glass substrate. Such a diffusion plate can diffuse the light incident thereon. The application of the fine microlens structures to the diffusion surface allows a decrease in the maximum spread angle of the light, compared to chemically-processed diffusion plates with fine concave-and-convex structures that are formed in the surfaces of glass plates by using a solution such as hydrofluoric acid. The decrease in the maximum spread angle leads, in turn, to a decrease in the divergence loss of the light. The diffusion angle defined as a half-value angle width at which the diffused light decreases in intensity to 50% of its maximum, is approximately six (6) degrees which is so small that the polarization characteristics are held. Here, it is assumed that the term "spot diameter" of a spot light is defined as its diameter with which the spot light's intensity is 13.5% of its peak intensity. The diffused light fluxes are superimposed on one another to form a spot light with a spot diameter ranging from 3 mm to 5 mm which enters rotary diffusion plate 57. Diffusion plate 53 diffuses the light such that the spot diameter of the spot light becomes equal to a desired spot diameter.

Rotary diffusion plate 57 is provided with: motor 56 disposed at a center portion, and circular diffusion plate 55 having diffusion region 55b which is configured by forming fine concave-and-convex structures in the surface of a glass substrate 55a in an annular-ring shape. Rotation of the rotary diffusion plate can be controlled. Rotary diffusion plate 57 is a diffusion plate capable of rotating at a high speed up to about 10800 rpm.

The diffusion region of the diffusion plate is composed of a chemically-processed diffusion plate offering a diffusion angle of approximately 12 degrees which allows the polarization characteristics to be held. Chemical formation of the diffusion regions on both sides of the diffusion plate is also possible. The diffusion plate with such both-sided diffusion regions can offer a larger diffusion angle than microlens-array diffusion plates. In addition, it is possible to configure a large-size diffusion plate at a relatively low cost. Although the chemically-processed diffusion plate offers an increased maximum spread angle, condenser lens 59 can efficiently converge such a spreading light. The rotation of the diffusion surface brings about high-speed, temporal-and-spatial variations in random interference patterns that are caused by the laser light on a screen, which allows elimination of speckle noises. Moreover, the use of diffusion plate 53 and rotary diffusion plate 57 can also reduce fine unevenness in luminance that is attributed to the number and sizes of fine light emission sites of the laser light sources.

The light diffused by rotary diffusion plate 57 is light which is almost free of speckles noises that are attributed to the laser light's properties excluding polarization. The light having been transmitted through rotary diffusion plate 57 is converged by condenser lens 59, thereby being converted into substantially collimated light.

Condenser lens 59 has a lens shape that is determined such that the condenser lens causes the spot light in the vicinity of rotary diffusion plate 57 to become collimated light. The optical elements from the red, the green, and the blue laser light source to condenser lens 59 maintain the polarization characteristics of the light; therefore, the light exiting from condenser lens 59 is S-polarized light.

The positions of the green laser light source and the red laser light source may be exchanged, with red-reflection dichroic mirror 48 being replaced by a green-reflection dichroic mirror.

The description has been made regarding the configuration in which diffusion plate 53 is the diffusion plate with a microlens array; however, the following substitute may be used. That is, a chemically-processed diffusion plate is used which shows a slightly lower light-converging efficiency but features a low cost.

The description has been made regarding the configuration in which circular diffusion plate 55 of rotary diffusion plate 57 is the chemically-processed diffusion plate; however, the circular diffusion plate may be a diffusion plate with a microlens array, although it is expensive. Rotary diffusion plate 57 may be another dynamic diffusion plate which does not rotate, but rocks or vibrates.

The configuration may be such that rotary diffusion plate 57 is a low-speed, rotatable one, with the diffusion plates and the reflection mirror being each provided with a mechanism for rocking or vibrating to reduce speckle noises. Reflection mirror 54 may be a multiple reflection mirror with a front-surface reflectance of 30% and a rear-surface reflectance of 100%, which thereby increases the amount of luminous fluxes of the laser light, leading to reduced unevenness in luminance attributed to the laser light.

The description has been made regarding the configuration in which the laser light sources are composed as follows: The red, the green, and the blue laser light source are composed of 24 units, 24 units, and eight (8) units of the corresponding semiconductor laser elements, respectively. The further-increased number of the semiconductor laser elements may be used to configure the laser light sources, for achieving increased luminance.

As described above, the light source device according to the present disclosure includes: the red, the green, the blue laser light source; the luminous-flux splitting element that is disposed in the laser light source for emitting a specific color, with the laser light source being less in the number of the semiconductor lasers than those for emitting the other colors; and the rotary diffusion plate. This allows the configuration of the light source device that features a small size and white light with a wide color gamut, while eliminating a decrease in unevenness in projection images which is attributed to the difference in the number of the semiconductor lasers among red, green, and blue.

Second Exemplary Embodiment

Figure 5:
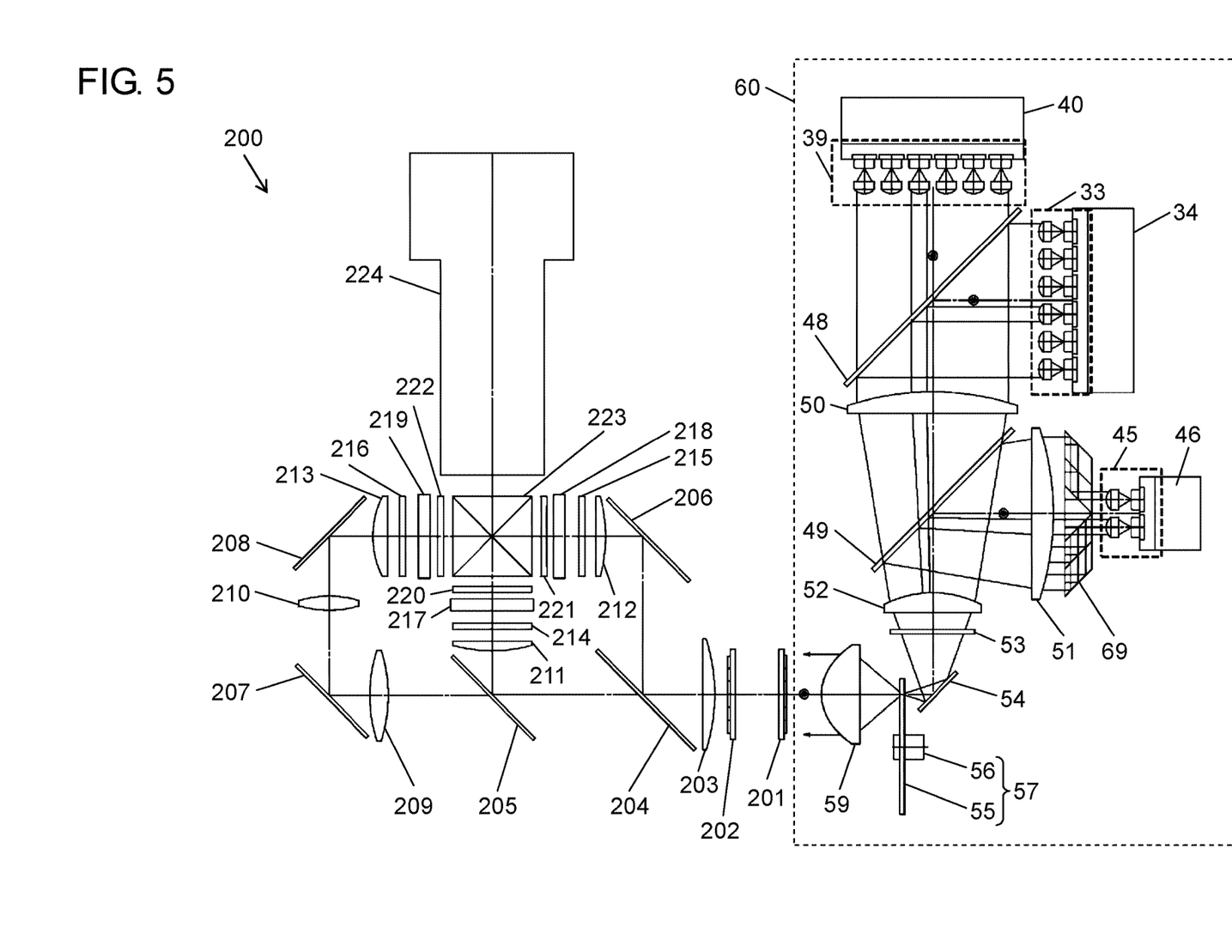
FIG. 5 is a view of a configuration of a first projection display apparatus according to a second embodiment of the present disclosure.

A second embodiment will be described with reference to FIG. 5. FIG. 5 is a view of a first projection display apparatus according to an embodiment of the present disclosure.

First projection display apparatus 200 includes image forming elements each of which employs an active-matrix, transmissive liquid crystal panel, either a twisted nematic (TN) mode or a vertical alignment (VA) mode. The pixel region of the panel is provided with thin-film transistors.

Light source device 60 of first projection display apparatus 200 is configured to include: red laser light source 33; green laser light source 39; blue laser light source 45; heat sinks 34, 40, and 46; red-reflection dichroic mirror 48; condenser lenses 50, 51, and 52; prism array 69 serving as a luminous-flux splitting element; blue-reflection dichroic mirror 49; diffusion plate 53; reflection mirror 54; rotary diffusion plate 57 configured with circular diffusion plate 55 and motor 56; and condenser lens 59. Such a light source device is the light source device that has been described in the first embodiment.

Moreover, first projection display apparatus 200 includes: first lens array plate 201, second lens array plate 202, superimposing lens 203, blue-reflection dichroic mirror 204, green-reflection dichroic mirror 205, reflection mirrors 206, 207, and 208, relay lenses 209 and 210, field lenses 211, 212, and 213, incidence-side polarizing plates 214, 215, and 216, liquid crystal panels 217, 218, and 219, exiting-side polarizing plates 220, 221, and 222, color combining prism 223 configured with a red-reflection dichroic mirror and a blue-reflection dichroic mirror, and projection lens 224.

White light coming from light source device 60 enters first lens array plate 201 that is configured with a plurality of lens elements. A luminous flux incident on first lens array plate 201 is divided into a large number of luminous fluxes. The large numbers of the divided luminous fluxes converge onto second lens array plate 202 that is configured with a plurality of lens elements. The lens elements of first lens array plate 201 are similar in opening shape to liquid crystal panels 217, 218, and 219. The lens elements of second lens array plate 202 have a focal length which is determined such that first lens array plate 201 and liquid crystal panels 217, 218, and 219 are substantially in a conjugate relation. The light having exited from second lens array plate 202 enters superimposing lens 203. Superimposing lens 203 is a lens intended to superimpose the light, which has exited from each of the lens elements of second lens array plate 202, onto liquid crystal panels 217, 218, and 219 to illuminate them. First and second lens array plates 201 and 202 and superimposing lens 203 configure an illumination optical system.

The light having come from superimposing lens 203 is separated into blue, green, and red light by blue-reflection dichroic mirror 204 and green-reflection dichroic mirror 205 which are means of color separation. The green light passes through field lens 211 and incidence-side polarizing plate 214, and then enters liquid crystal panel 217. The blue light is reflected off reflection mirror 206, passes through field lens 212 and incidence-side polarizing plate 215, and then enters liquid crystal panel 218. The red light passes through relay lens 209, is reflected off reflection mirror 207, passes through relay lens 210, is reflected off reflection mirror 208, passes through field lens 213 and incidence-side polarizing plate 216, and then enters liquid crystal panel 219. In this way, the light having come from light source device 60 is caused to converge by the illumination optical system, to illuminate the liquid crystal panels, i.e. to-be-illuminated regions.

Three liquid crystal panels 217, 218, and 219 form a green, a blue, and a red image, respectively, in the following manner. That is, each of the liquid crystal panels 217, 218, and 219 changes polarization states of the corresponding incident light by controlling voltages applied to its pixels that are individually specified in accordance with an image signal. The light with the thus-changed polarization states is modulated to form an image of the corresponding color, through use of a corresponding one of the combinations of incidence-side polarizing plates 214, 215, and 216 and, respectively, exiting-side polarizing plates 220, 221, and 222. Each of the combinations is configured as follows: Each of the incidence-side polarizing plates and the corresponding exiting-side polarizing plate are disposed on both sides of the corresponding liquid crystal panel, on an each-for-each side basis, such that the transmission axis of the incidence-side polarizing plate concerned is orthogonal to the transmission axis of the corresponding exiting-side polarizing plate.

The fluxes of the color light having passed through respective exiting-side polarizing plates 220, 221, and 222 are combined by color combining prism 223 in the following manner. That is, of the color light, the red and the blue light are respectively reflected off a red-reflection dichroic mirror and blue-reflection dichroic mirror of the prism, and are then combined together with the green light. Then, the thus-combined light enters projection lens 224. The light having entered projection lens 224 is then enlarged and projected onto a screen (not shown).

In cases where light coming from a light source device that uses a solid-state light source is unpolarized light, a projection display apparatus has conventionally been configured using polarization conversion elements. Fortunately, in the present disclosure, the light exiting from the light source device is the S-polarized light, which allows elimination of the need for such polarization conversion elements. This allows an improvement in the light-converging efficiency of the projection display apparatus, and a reduction in its cost.

The light source device is configured in a small size using the red, the green, and the blue laser light source, and is capable of emitting white light that features high color purity of three primary colors. This makes it possible to implement the projection display apparatus featuring a small-size and a wide color gamut. Moreover, the means of forming images is performed not through time sharing, but through use of the three liquid crystal panels that utilize polarization. This allows formation of projection images featuring no color breaking phenomenon, high luminance, favorable color reproduction, and high definition. Furthermore, compared to cases where three DMDs are used, the projection display apparatus described above can be configured in a small size because it does not use any total internal reflection prism but uses the color combining prism being a small-size 45-degree-incidence prism.

As described above, the first projection display apparatus according to the present disclosure uses the light source device that includes: the red, the green, the blue laser light source; the luminous-flux splitting element that is disposed in the laser light source for emitting a specific color, with the laser light source being less in the number of the semiconductor lasers than those for emitting the other colors; and the rotary diffusion plate. This allows the configuration of the projection display apparatus that features a small size and white light with a wide color gamut, while eliminating a decrease in unevenness in projection images which is attributed to the difference in the number of the semiconductor lasers among red, green, and blue.

The first projection display apparatus is configured using the transmissive liquid crystal panels as the image forming elements; however, reflective liquid crystal panels may be used as the image forming elements. Use of the reflective liquid crystal panel allows configuration of the projection display apparatus that features a smaller size and high definition.

Third Exemplary Embodiment

Figure 6:
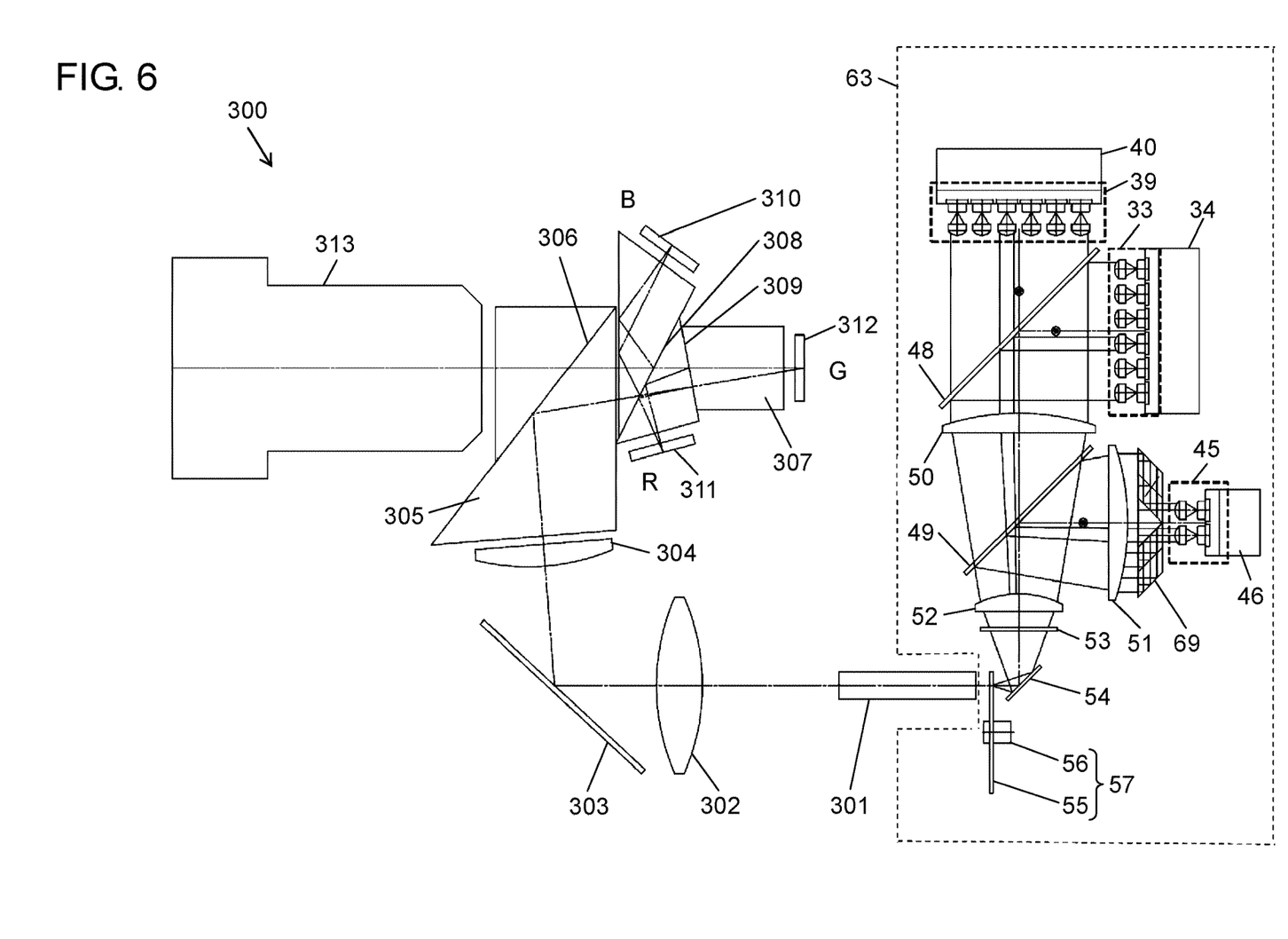
FIG. 6 is a view of a configuration of a second projection display apparatus according to a third embodiment of the present disclosure.

A third embodiment will be described with reference to FIG. 6. FIG. 6 is a view of a second projection display apparatus according to the embodiment. Second projection display apparatus 300 uses three mirror-deflection digital micromirror devices (DMDs) as three image forming elements.

Light source device 63 of second projection display apparatus 300 is configured to include: red laser light source 33; green laser light source 39; blue laser light source 45; heat sinks 34, 40, and 46; red-reflection dichroic mirror 48; condenser lenses 50, 51, and 52; prism array 69 serving as a luminous-flux splitting element; blue-reflection dichroic mirror 49; diffusion plate 53; reflection mirror 54; and rotary diffusion plate 57 configured with circular diffusion plate 55 and motor 56. A difference of the light source device from light source device 60 according to the first embodiment of the present disclosure is in that condenser lens 59 is not disposed.

White light having exited from light source device 63 is converged onto rod 301. The light incident on rod 301 is subjected to multiple-times reflection in the inside of the rod, thereby making the light intensity distribution uniform. The thus-uniformed light exits from the rod. The light having exited from rod 301 is converged by relay lens 302 and reflected off reflection mirror 303, and then passes through field lens 304 to enter total internal reflection prism 305.

Total internal reflection prism 305 is configured with two prisms. There exists thin air layer 306 between vicinal faces of the two prisms. Air layer 306 totally reflects light incident thereon at angles not smaller than a critical angle of total reflection. The light having come from field lens 304 is totally reflected off a total-reflection face of total internal reflection prism 305 to enter color prism 307.

Color prism 307 is configured with three prisms with vicinal faces between the three. On each of the vicinal faces, a corresponding one of blue-reflection dichroic mirror 308 and red-reflection dichroic mirror 309 is formed. Blue-reflection dichroic mirror 308 and red-reflection dichroic mirror 309 of color prism 107, separate the incident light into blue, red, and green light. Then, the separated light fluxes enter respective DMDs 310, 311, and 312. In this way, the illumination optical system configured with rod 301 causes the light having come from light source device 63 to illuminate to-be-illuminated regions in which micromirrors of the DMDs are arranged.

Each of DMDs 310, 311, and 312 deflects its micromirrors in accordance with an image signal, thereby reflecting the corresponding light to form an image as follows: That is, the DMD reflects a part of the incident light thereon to enter projection lens 313 and reflects the other part toward the outside of an effective area of projection lens 313. The light having been reflected off each of DMDs 310, 311, and 312 passes through color prism 307 again. In the course of passing through color prism 307, the blue, the red, and the green light which have been once separated are combined together, and then enters total internal reflection prism 305. The light having entered total internal reflection prism 305 passes through air layer 306 because of its incident angle not larger than the critical angle of total reflection, and then enters projection lens 313. In this way, the light of image formed by DMDs 310, 311, and 312 is enlarged and projected on a screen (not shown).

The light exiting from the light source device is not required to be linearly-polarized light because of the use of the DMDs. In this case, the light exiting from each of the red, the green, and the blue laser light source may be either S-polarized light or P-polarized light. Moreover, the optical elements from the laser light sources to diffusion plate 58 are not required to hold the polarization characteristics of the light.

The light source device is configured in a small size by using the red, the green, and the blue laser light source and is capable of emitting white light that features high color purity of three primary colors. This makes it possible to implement the projection display apparatus featuring a small-size and a wide color gamut. The use of the DMDs as the image forming elements makes it possible to configure the projection display apparatus that features good resistance to light and heat, compared to image forming elements that use liquid crystal panels. Moreover, the use of the three DMDs makes it possible to achieve projection images with good color reproduction, high luminance, and high definition.

As described above, the second projection display apparatus according to the present disclosure uses the light source device that includes: the red, the green, the blue laser light source; the luminous-flux splitting element that is disposed in the laser light source for emitting a specific color, with the laser light source being less in the number of the semiconductor lasers than those for emitting the other colors; and the rotary diffusion plate. This allows the configuration of the projection display apparatus that features a small size and white light with a wide color gamut, while eliminating a decrease in unevenness in projection images which is attributed to the difference in the number of the semiconductor lasers among red, green, and blue.

Although the image forming element is configured with the three DMDs, it may be configured using one DMD. Use of the one DMD allows the configuration of a projection display apparatus featuring a smaller size and lower price.

INDUSTRIAL APPLICABILITY

The present disclosure relates to projection display apparatuses using image forming elements.

What is claimed is:
1. A light source device, comprising:
a first solid-state light source that emits a first color of light having a luminous flux;
a second solid-state light source that emits a second color of light having a luminous flux, the first color being different from the second color;
a third solid-state light source that emits a third color of light having a luminous flux, the third color being different from the first and second colors;
a dichroic mirror that combines, into combined light, the first color of light, the second color of light and the third color of light having exited from the respective first, second and third solid-state light sources;

a diffusion plate on which the combined light having exited from the dichroic mirror is incident; and a luminous-flux splitting element that is configured to split the luminous flux having exited from the third solid-state light source, and is located between the third solid-state light source and the dichroic mirror, wherein the first solid-state light source includes a plurality of red semiconductor laser elements, the second solid-state light source includes a plurality of green semiconductor laser elements, the third solid-state light source includes a plurality of blue semiconductor laser elements, and the plurality of blue semiconductor laser elements is smaller in number than the plurality of red semiconductor laser elements.

2. The light source device according to claim 1, wherein the luminous-flux splitting element is a prism array including:
   a prism having:
      a beam-splitter plane functional for an incident angle of 45 degrees; and
      a reflection plane; and
   a prism joined to the beam-splitter plane.

3. The light source device according to claim 1, wherein the luminous-flux splitting element is a prism array including:
   a prism having:
      a beam-splitter plane functional for an incident angle of 30 degrees; and
      a reflection plane; and
   a prism joined to the beam-splitter plane wherein an air layer is disposed between the joined prism and the beam-splitter plane.

4. The light source device according to claim 1, wherein the luminous-flux splitting element is a mirror array including:
   a plate beam-splitter functional for an incident angle of 45 degrees; and
   a reflection mirror.

5. A projection display apparatus, comprising:
   the light source device according to claim 1, the light source device emitting light;
   an illumination optical system that converges the light having exited from the light source device;
   an image forming element that is illuminated with the light having exited from the illumination optical system, the image forming element forming an image in accordance with an image signal; and
   a projection lens that enlarges and projects the image formed by the image forming element.

6. The projection display apparatus according to claim 5, wherein the image forming element is a liquid crystal panel.

7. The projection display apparatus according to claim 5, wherein the image forming element is a mirror-deflection digital micromirror device.

8. A light source device, comprising:
   a first solid-state light source that emits a first color of light having a luminous flux;
   a second solid-state light source that emits a second color of light having a luminous flux, the first color being different from the second color;
   a third solid-state light source that emits a third color of light having a luminous flux, the third color being different from the first and second colors;
   a dichroic mirror that combines, into combined light, the first color of light, the second color of light and the third color of light having exited from the respective first, second and third solid-state light sources;
   a diffusion plate on which the combined light having exited from the dichroic mirror is incident; and
   a luminous-flux splitting element that is configured to split the luminous flux having exited from the third solid-state light source, and is located between the third solid-state light source and the dichroic mirror, wherein
   the first solid-state light source includes a plurality of red semiconductor laser elements,
   the second solid-state light source includes a plurality of green semiconductor laser elements,
   the third solid-state light source includes a plurality of blue semiconductor laser elements, and
   the plurality of blue semiconductor laser elements is smaller in number than the plurality of green semiconductor laser elements.

9. The light source device according to claim 8, wherein the luminous-flux splitting element is a prism array including:
   a prism having:
      a beam-splitter plane functional for an incident angle of 45 degrees; and
      a reflection plane; and
   a prism joined to the beam-splitter plane.

10. The light source device according to claim 8, wherein the luminous-flux splitting element is a prism array including:
    a prism having:
       a beam-splitter plane functional for an incident angle of 30 degrees; and
       a reflection plane; and
    a prism joined to the beam-splitter plane wherein an air layer is disposed between the joined prism and the beam-splitter plane.

11. The light source device according to claim 8, wherein the luminous-flux splitting element is a mirror array including:
    a plate beam-splitter functional for an incident angle of 45 degrees; and
    a reflection mirror.

12. A projection display apparatus, comprising:
    the light source device according to claim 8, the light source device emitting light;
    an illumination optical system that converges the light having exited from the light source device;
    an image forming element that is illuminated with the light having exited from the illumination optical system, the image forming element forming an image in accordance with an image signal; and
    a projection lens that enlarges and projects the image formed by the image forming element.

13. The projection display apparatus according to claim 12, wherein the image forming element is a liquid crystal panel.

14. The projection display apparatus according to claim 12, wherein the image forming element is a mirror-deflection digital micromirror device.

* * * * *